Oct. 30, 1956     M. L. WIMBLE     2,769,155
ELECTRONIC TEST PROD, CLIP AND WIRE TAPPER
Filed March 22, 1954
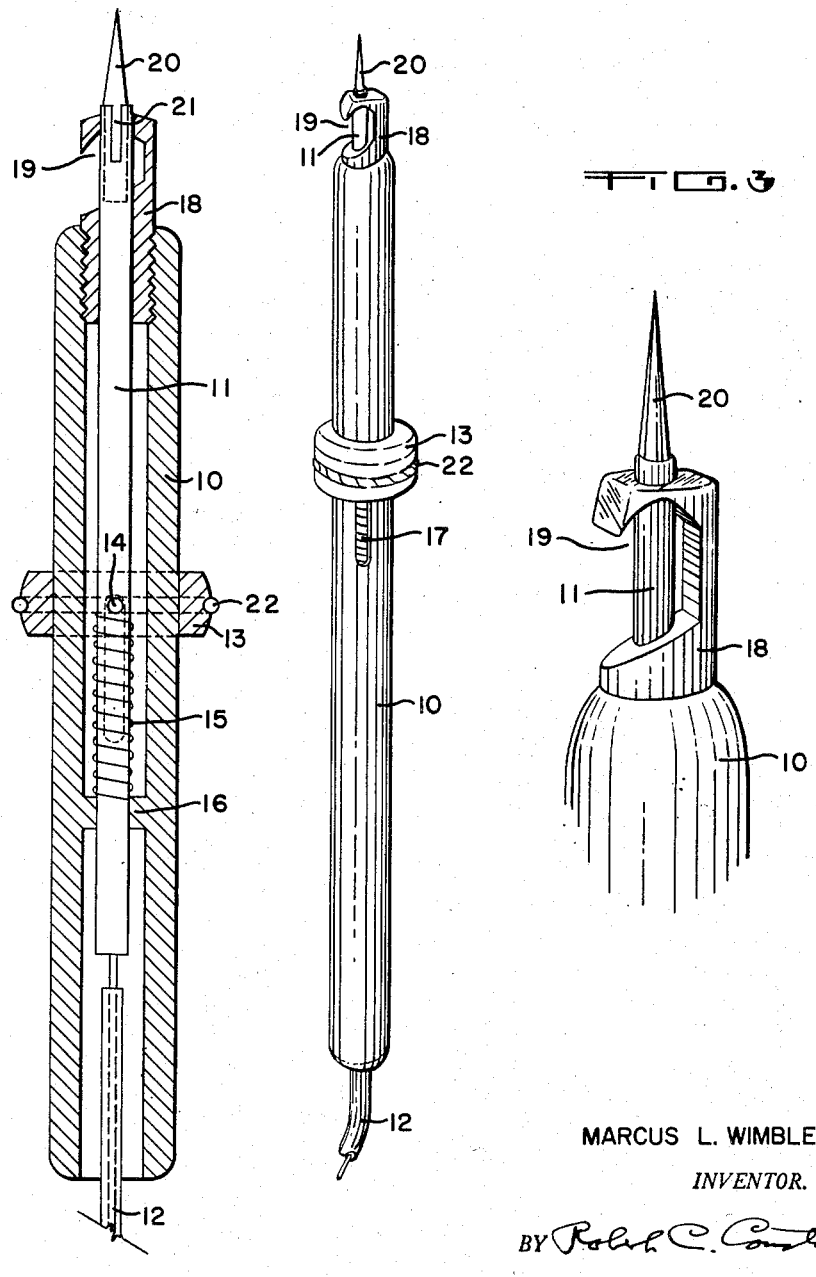
MARCUS L. WIMBLE
*INVENTOR.*
BY *Robert C. Comstock*
HIS ATTORNEY

United States Patent Office 2,769,155
Patented Oct. 30, 1956

2,769,155

ELECTRONIC TEST PROD, CLIP AND WIRE TAPPER

Marcus L. Wimble, Los Angeles, Calif.

Application March 22, 1954, Serial No. 417,595

2 Claims. (Cl. 339—108)

This invention relates to a combination electronic test prod, clip and wire tapper.

It is an object of my invention to provide a device which is capable of being used as a test prod for electronic circuits, as an electrical clip to connect to a bare or insulated wire or as a wire tapper to tap a bare or insulated wire.

Another object of my invention is to provide such a device which is simple in construction and economical to manufacture and which is therefore within the reach of every television and radio repair man and tester and other workers in the field of electronics.

It is a further object of my invention to provide such a device having a sharp point which is held under spring tension and which is capable of being easily retracted with one hand for attachment of my test prod to any part of an electronic circuit or to pierce an insulated electrical wire.

Yet another object of my invention is to provide such a device having an end portion which is adapted to hold an insulated wire of substantially any size for clipping or tapping, the end portion having an opening through which the point may be passed.

Still another object of my invention is to provide such a device in which there is no mechanical joint or connection between the point which establishes the electric contact and the outlet wire, so that substantially no additional electrical resistance is introduced to affect the reading and so that there is no possibility of an imperfect contact occurring in the use of my device.

It is also among the objects of my invention to provide such a device which is extremely simple to use, requiring only one hand to attach it to the circuit and which is capable of maintaining a contact or position by itself, freeing the hands of the operator.

My invention also comprises such other objects, advantages and capabilities as will later more fully appear and which are inherently possessed by my invention.

While I have shown in the accompanying drawings a preferred embodiment of my invention, it should be understood that the same is susceptible of modification and change without departing from the spirit of my invention.

Referring to the drawings, Fig. 1 is a sectional view of my device;

Fig. 2 is a top perspective view of the same;

Fig. 3 is a top perspective view of the top portion of my device.

A preferred embodiment which has been selected to illustrate my invention comprises an elongated hollow barrel 10, which is preferably formed of plastic, fiber or other suitable electrically non-conducting material. Movably mounted within barrel 10 is an elongated rod 11, which is preferably formed of metal. An insulated electrical outlet wire 12 is connected at one end to the bottom of rod 11. The other end of outlet wire 12 is connected to an electrical test instrument or such other outlet or testing source as may be desired.

A circular finger control 13 is slidably mounted surrounding the outside of barrel 10 adjacent the center thereof. Since the finger control 13 encircles the barrel 10, it can be operated when the device is in any position and rotation of the device to obtain access to the finger control is unnecessary. Finger control 13 is preferably made of fiber or the like. A pin 14 extends from finger control 13 through the side of barrel 10 into rod 11.

A coil spring 15 is mounted surrounding rod 11 within barrel 10, the upper end of coil spring 15 contacting pin 14 and being prevented from upward movement thereby. Barrel 10 is provided with an integral cross piece 16 through which rod 11 extends and which acts as a base and stop member for the bottom of coil spring 15. The outside of barrel 10 is provided with a longitudinal slot 17, which is capable of accommodating pin 14 as it moves toward the bottom of barrel 10. A small groove extends around finger control 13, in which groove is mounted a circular plastic or rubber band 22. Rubber band 22 holds pin 14 in place and also acts as an insulator to prevent contact with the end of pin 14. Rubber band 22 may be removed in order to provide access to pin 14 for its removal.

The top of barrel 10 is provided with internal screw threading in which is mounted an end member 18, which may be made of metal or fiber. When my device is used in close quarters, it is preferable that end member 18 be made of electrically non-conducting material in order to avoid making undersirable electrical contacts in the circuit. In other uses, it may be desirable for end member 18 to be made of electrically conducting material so that it may be used to make electrical contacts.

End member 18 is provided with longitudinal openings through which rod 11 extends and may be moved. End member 18 is provided with a cutaway portion 19 adjacent the top thereof, which is capable of receiving and holding an electrical wire.

Removably mounted in the top of rod 11 is a test point 20, which is preferably sharply pointed, such as a phonograph needle, which is capable of being used as the test point 20 of my device. The end of rod 11 is hollowed to receive the butt end of test point 20 and is provided with a small slot 21 to facilitate the removal and replacement of test point 20.

In use, my device may be used as an electronic test prod with test point 20 establishing electrical contact with any uninsulated part of an electronic circuit.

If the operator desires to use my device to establish contact with an insulated wire, he exerts downward pressure on finger control 13. This can be done with the same hand which holds barrel 10, leaving the other hand of the operator free for other purposes. When backward pressure is exerted on finger control 13, it moves toward the bottom of barrel 10 against the pressure of coil spring 15. The movement of finger control 13 moves pin 14 and rod 11 toward the bottom of barrel 10. During such movement, pin 14 travels in slot 17 until it reaches the lower end thereof.

At this time, test point 20 is withdrawn into barrel 10 until its point is positioned adjacent the bottom of cutaway portion 19. The hook at the end of end member 18 can then be placed around the insulated wire, which is held within cutaway portion 19. The hook can be provided with a U or V shape, which will help to center the wire along the path of test point 20.

Finger control 13 may then be released by the operator, permitting coil spring 15 to exert pressure on pin 14 to move rod 11 and test point 20 toward the top of barrel 10. Further pressure can be supplied by the fingers of the operator, moving finger control 13 upwardly, if additional force is necessary to complete the piercing of the insulation. Once contact has been made with the wire, further finger pressure is unnecessary. If an electrical contact is desired with a soldered connection, the same method may be used to withdraw test point 20 and release it to contact the connection, which is held within cutaway portion 19. In the use described above, my device may be left by itself after it has been placed in position and it will retain the contact as long as desired, freeing the hands of the operator for other uses.

In the case of uninsulated wire of various sizes, it is possible to hook the wire between the side of test point 20 or rod 11 and the side of cutaway portion 19. The tapered sides of test point 20 hold the uninsulated wire between them and the side or end of cutaway portion 19. The test point 20 will still extend outwardly beyond the end of the end member 18 so that my device may be used as a test prod at the same time that it is clipped to an uninsulated wire. Electrical contact may thus be established between the uninsulated wire held within the cutaway portion 19 and any circuit contacted by the test point 20.

My device may also be used in substantially the same manner described above to hold small parts or wires in position for soldering or to remove soldered parts from a circuit, particularly when they lie in difficult or inaccessible places.

It may be noted that the pressure which is exerted on test point 20 by coil spring 15 makes it easy for the operator to maintain an electrical contact when my device is used as a test prod. If test point 20 is held with a slight amount of pressure, any relaxing or movement of the operator's hand will be compensated for by coil spring 15 to maintain the contact instead of losing it, as would occur with an ordinary test prod.

If my device is used in a position where access to finger control 13 is difficult or impossible, the operator need only pull downwardly on outlet wire 12, thus moving rod 11 downwardly and retracting test point 20.

End member 18, being screw threadedly mounted in the end of barrel 10, may easily be removed and replaced by an end member of larger or smaller size, depending upon the work which is to be performed.

From the foregoing description, it will be seen that my device is a versatile electronic instrument which is capable of many uses and applications.

I claim:

1. A combination test prod, clip and wire tapper comprising an elongated hollow body member formed of electrically non-conducting material, an elongated electrically conducting rod movably mounted within said body member, said rod having a tapered test point at one end thereof, an end member disposed at the end of said body member adjacent said test point, said end member having an opening extending therethrough, said test point normally extending through said opening and susbtantially beyond the end of said end member, said end member having a cut-away portion forming a hook at the end thereof between said opening and said body member, said hook having an open side and a closed side disposed on opposite sides of said rod, a portion of said closed side being spaced from said rod to provide means for receiving and holding an uninsulated wire, a circular finger control encircling the outside of said body member, a pin extending from said finger control to said rod, said body member having a slot permitting movement of said finger control and pin with respect to said body member, a coil spring disposed within said body member surrounding said rod, one end of said spring contacting said pin and the other end of said spring contacting a portion of said body member, said coil spring normally urging said test point outwardly from said body member so that said test point provides a resilient test prod, said finger control adapted to be moved against the pressure of said coil spring to move said rod and retract said test point within said body member until the end thereof is disposed adjacent the bottom of said cut-away portion to permit a wire to be inserted within said hook through the open side thereof, said test point adapted upon release thereof to act as a wire tapper by piercing an insulated wire disposed within said hook in alignment with said test point said device adapted to act as a clip by holding an uninsulated wire within the space between said test point and the closed side of said cut-away portion while said test point simultaneously extends outwardly from the end of said end member to provide a resilient test prod.

2. A combination test prod, clip and wire tapper comprising an elongated hollow body member formed of electrically non-conducting material, an elongated electrically conducting rod movably mounted within said body member, said rod having a tapered test point at one end thereof, an end member disposed at the end of said body member adjacent said test point, said end member having an opening extending therethrough, said test point normally extending through said opening and substantially beyond the end of said end member, said end member having a cut-away portion forming a hook at the end thereof between said opening and said body member, said hook having an open side and a closed side disposed on opposite sides of said rod, a portion of said closed side being spaced from said rod to provide means for receiving and holding an uninsulated wire, a finger control disposed on the outside of said body member, said finger control being connected to said rod, said body member having means permitting movement of said finger control with respect to said body member, a coil spring disposed within said body member surrounding said rod, said coil spring normally urging said test point outwardly from said body member so that said test point provides a resilient test prod, said finger control adapted to be moved against the pressure of said coil spring to move said rod and retract said test point within said body member to permit a wire to be inserted within said hook through the open side thereof, said test point adapted upon release thereof to act as a wire tapper by piercing an insulated wire disposed within said hook in alignment with said test point and to act as a clip by holding an uninsulated wire within said cut-away portion between said test point and the closed side of said cut-away portion, while said test point simultaneously extends outwardly from the end of said end member to provide a resilient test prod.

References Cited in the file of this patent

UNITED STATES PATENTS

| | | |
|---|---|---|
| 953,678 | Luther | Mar. 29, 1910 |
| 2,204,295 | Brockman | June 11, 1940 |
| 2,221,651 | Pelz | Nov. 12, 1940 |
| 2,580,682 | Kraft | Jan. 1, 1952 |
| 2,639,318 | Des Roches | May 19, 1953 |
| 2,675,528 | La Point | Apr. 13, 1954 |